United States Patent Office 3,637,831
Patented Jan. 25, 1972

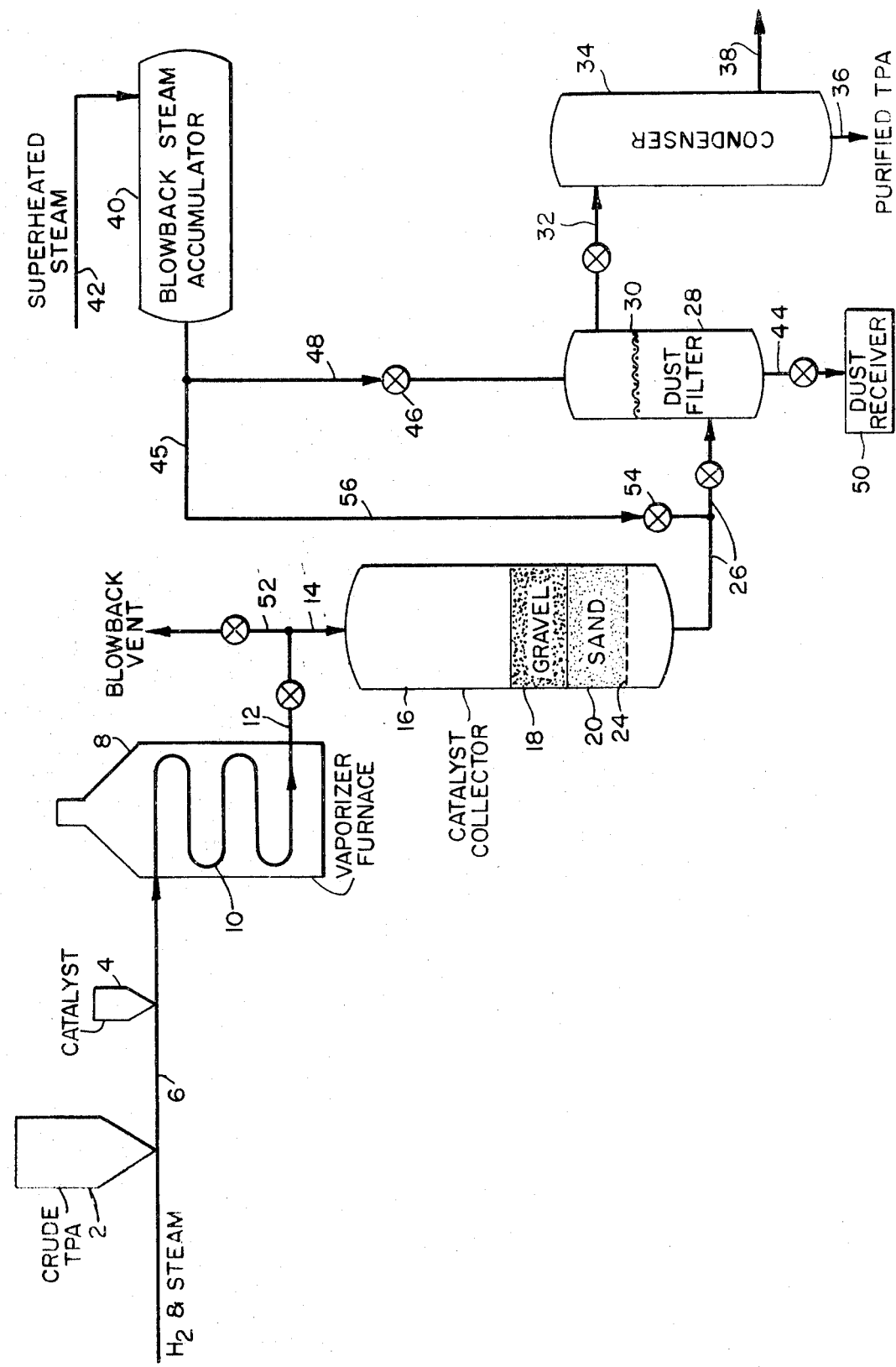

3,637,831
CATALYTIC TREATMENT OF VAPORIZED ACIDS
Albert L. Remsberg, Silsbee, Tex., assignor to
Mobil Oil Corporation
Filed Sept. 25, 1967, Ser. No. 671,535
Int. Cl. C07c 51/42
U.S. Cl. 260—525
22 Claims

ABSTRACT OF THE DISCLOSURE

Continuous purification of aromatic polycarboxylic acids (e.g., crude terephthalic acid) by treatment of the vaporized acid in the presence of a suspended finely divided solid hydrogenation catalyst (e.g., palladium-on-carbon) and hydrogen at elevated temperatures wherein more effective utilization of the catalyst is obtained by filtering most of the suspended catalyst out of the vapor stream onto one or more catalyst retention beds of particles of inert refractory material (e.g., sand and gravel) and thereafter condensing the purified acid vapor to the solid state in the substantial absence of extraneous solids; much of the very fine ash which is also usually present is similarly retained by the beds with a substantial reduction in the load on the usual final surface or membrane filters and the small amount of catalyst particles passing through the retention beds serves as a filtering assistant that facilitates clearing the surface filters of the cementitious layer of finer ash particles.

BACKGROUND OF THE INVENTION

Field of the invention

This invention relates to an improved method for the purification of vaporizable aromatic polycarboxylic acids. In one embodiment, it is particularly adapted to the production of terephthalic acid of high purity from a crude acid contaminated with para-carboxybenzaldehyde and other substances by a process involving the treatment of the vaporized crude acid in the presence of a hydrogen and a finely divided catalyst suspended in the vapor.

DESCRIPTION OF THE PRIOR ART

Terephthalic acid is a substance of increasing commercial importance as exemplified by its use in large quantities in the production of fiber and film-forming polyesters, such as polyethylene terephthalate of high molecular weight. For many purposes, including its use in textile fibers and magnetic tape bases, an extremely high degree of purity is necessary in such polyesters to obtain the desired color, dyeing characteristics and/or excellent physical and electrical properties. Heretofore, most commercial production of such pure polyesters has involved an indirect route of converting the acid to its dimethyl ester and purifying the ester by recrystallization or distillation prior to transesterification with a glycol, such as ethylene glycol, and polymerization. More recently, it has been found advantageous to directly esterify terephthalic acid of high purity with the glycol; hence, efficient and economical methods for the purification of terephthalic acid are now of prime importance.

Terephthalic acid can be manufactured by several processes known in the art, as exemplified by the catalytic oxidation of p-xylene according to the processes described in U.S. Pats. 2,833,816; 2,853,514; 3,036,122 and others.

The major impurities present in terephthalic acid prepared by the catalytic oxidation of p-xylene result from incomplete oxidation; and the crude product generally contains about 0.5 to 3% of p-carboxybenzaldehyde as well as other intermediate oxidation by-products, usually including p-toluic acid. Leaching of this crude product with hot acetic acid or another suitable agent may be employed to reduce the content of such impurities and provide a leached crude material typically containing about 0.2 to 1.5% p-carboxybenzaldehyde. Also a much smaller amount of ash is typically present in the form of one or more metal compounds derived from the residue of a metal salt oxidation catalyst (e.g. cobalt acetate catalyst) and/or the corrosion of process equipment, silica and organic decomposition products. A particularly troublesome by-product of p-xylene oxidation is p-carboxybenzaldehyde which acts as a chain stopper during subsequent polyesterification of the terephthalic acid and, either alone or in combination with other intermediate oxidation products, imparts undesirable coloration to the resulting polyester product. Moreover, it is difficult to remove this aldehyde compound from terephthalic acid by conventional techniques, particularly in meeting commercial specification for a maximum p-carboxybenzaldehyde content in the range of 15 to 50 parts per million (p.p.m.) by weight.

Various procedures have been proposed for the purification of terephthalic acid including fractional recrystallization, leaching and sublimation with fractional condensation, but all of these methods have their limitations either as to effectiveness or the operating difficulties encountered therewith. More recently, better results have been obtained in a treatment of vaporized crude terephthalic acid in the presence of a hydrogen and a hydrogenation catalyst in either a fixed bed or as finely divided solid particles suspended in the acid vapor. Although the chemistry involved in this treatment is not yet fully understood, there is some reason to believe that the p-carboxybenzaldehyde eliminated during the process is converted into benzoic acid. The latter substance is a far less objectionable impurity as it remains in the vapor state while the purified terephthalic acid is being fractionally condensed from the vapor stream as solid particles.

Employing a finely divided hydrogenation catalyst in suspension in the vapor stream has distinct advantages over the use of a fixed bed catalyst in the treatment, especially in producing a consistently uniform purified product, inasmuch as the catalytic activity of a fixed bed decreases rapidly here during the course of a continuous process. When a fresh fixed catalyst bed is placed on-stream, initially a substantial and undesirable decarboxylation of the terephthalic acid apparently occurs as a result of excessive catalyst activity; and finally as the catalyst is nearly spent, the conversion or other elimination of p-carboxybenzaldehyde becomes insufficient.

While the catalyst suspension technique has provided superior product uniformity in the treatment, certain problems have arisen in the separation of the suspended catalyst and ash particles by passage of the vapor stream through a fine surface filter which removes substantially all solid particles prior to the condensation of the terephthalic acid in purified solid form. The solid particles lodged on the filter surface must be cleared by frequent reverse flow blowback operations to decrease the rapidly increasing resistance to the flow of vapor through the filter. While the blowback operation is facilitated by the presence of the catalyst particles in the layer of solids on the filter because the catalyst particles are bulkier or coarser than the ash particles, nevertheless the blowback stage is an off-stream period in filter usage; moreover the catalyst is not being utilized efficiently when frequent blowback steps are necessary. By reason of the cementitious or adhesive nature of the ash, catalyst particles reaching the filter with substantial residual catalytic activity and lodging thereon as a relatively thin dense layer are quickly masked or covered by ash particles accumulating on the surfaces of the catalyst particles so that the catalyst exerts relatively little or no catalyic effect on the vapor sream passing through the layer on the filters. Probably more important is the fact that after being dislodged by blowback, there is no significant exposure of the catalyst particles to the vapor stream.

The present invention is particularly directed at providing longer on-stream periods and more effective catalyst utilization in the suspended catalyst method, especially in treating terephthalic acid.

SUMMARY OF THE INVENTION

This invention concerns a process for purifying an impure, vaporizable, aromatic polycarboxylic acid which includes heating the acid sufficiently for substantial vaporization thereof, forming a suspension of finely divided particles of a solid hydrogenation catalyst in a gaseous mixture containing said acid vapor and hydrogen, passing the resulting suspension through at least one bed of substantial depth containing discrete particles of refractory solid material sized to retain a major proportion by weight of the catalyst particles in the bed and thereafter condensing the acid vapor to solid form in the substantial absence of the catalyst.

Narrower aspects of the invention relate to one or more of such features as a preferred class of catalysts, namely, Group VIII metals, and especially palladium on a carbon support; the purification of crude terephthalic acid, especially when contaminated with p-carboxybenzaldehyde and ash; the use of a thin porous filter to separate residual solid particles in the effluent from said bed; periodically reducing the resistance to gas flow through the bed by a high velocity blowback operation; the proportions of catalyst and hydrogen in the charge; employing a coarse refractory bed upstream of the bed of fine refractory particles, preferably of gravel and sand, respectively; preferred size ranges for the catalyst particles and the bed materials, especially for retaining major proportions by weight of both the catalyst and the ash in the beds. As described hereinafter, the "in depth" filtration and retention of the catalyst and ash particles provides more efficient and economical catalyst utilization in combination with the excellent catalyst selectivity (i.e., uniform degree of catalysis) obtainable with a catalyst suspended in the reaction mixture. Still other features of the invention and benefits obtained therewith will be apparent to those skilled in the art upon consideration of the subsequent detailed disclosure in which all quantities and proportions are set forth on a basis of weight unless otherwise indicated.

The instant method is useful for purifying aromatic carboxylic acids which are vaporizable without substantial decomposition and which are contaminated with one or more foreign substances, such as aldehyde compounds, that are capable of conversion or reaction in the vapor phase at elevated temperatures in the presence of suspended particles of a finely divided solid hydrogenation catalyst and hydrogen. Preferably such acids are of the normally solid, sublimable type as exemplified by trimesic acid, trimellitic acid and pyromellitic acid. The novel procedure is particularly suitable for the purification of sublimable, aromatic dicarboxylic acids, such as terephthalic acid. Accordingly, and in view of the current commercial interest in highly purified terephthalic acid, the present invention is described hereinafter with particular emphasis on the purification of crude terephthalic acid contaminated with p-carboxybenzaldehyde, other organic compounds and inorganic materials including the residue of a metal salt employed in the oxidation of p-xylene. However, the invention should not be regarded as limited to this specific process since it is obviously applicable to vapor phase reactions in general that employ a catalytic substance suspended or dispersed as solid particles in the vaporized material and wherein it is advantageous to deposit the catalyst particles from the vapor onto a substantial depth or volume of solid materials having extensive surface areas in the form of porous beds that provide relatively low resistance to the flow of gases therethrough.

BRIEF DESCRIPTION OF THE DRAWING

The figure is a flow sheet of the schematic type illustrating one embodiment of a continuous purification process according to the present invention.

DESCRIPTION OF A SPECIFIC EMBODIMENT

Referring to the drawing, the feed hopper 2 contains a supply of crude terephthalic acid (TPA) powder of about 10 to 100 microns average particle size (e.g., 80% by weight in the 5–50 micron range) prepared by the catalytic oxidation of p-xylene with oxygen using a cobalt acetate tetrahydrate catalyst followed by leaching of the filtered oxidation product in hot acetic acid containing a small amount of water, filtration and drying of the leached material. This charge typically contains 6,000 p.p.m. of p-carboxybenzaldehyde along with 30 p.p.m. of ash and 3,000 p.p.m. of other more volatile intermediate oxidation products comprising chiefly p-toluic acid.

A catalyst feed apparatus 4 is supplied with a 5% by weight slurry in water of the composite hydrogenation catalyst which is maintained under suitable agitation to provide a uniform dispersion. The preferred catalytic material contains 5% by weight of palladium in metal or elemental form supported on activated carbon particles or granules having a predominant proportion by weight of particles in the size range between 20 and 100 microns with some of smaller size. Contact agents of this type are commercially available and widely employed in hydrogenation reactions.

The crude terephthalic acid in particle form is introduced at ambient temperature at a rate of 15,000 lb./hr. by means of a star feeder (not shown) into the charge line 6 through which is flowing a mixture of 24,400 lb./hr. of steam (15 mol/mol TPA) and 30,000 standard cubic feet/hr. of hydrogen (2.0 s.c.f./lb. TPA) at a temperature of 700° F. In the schematically shown catalyst feeder 4, a stream of superheated steam is employed to vaporize the water content of the aqueous catalyst slurry delivered from a storage tank by a metering pump and to inject the contact material in the form of dry catalyst particles suspended in steam into charge line 6 at a constant rate of 10 lbs./hr. of palladium-on-carbon catalyst on a dry basis.

To conserve heat, all of the lines, vessels and other equipment described herein as operating at elevated temperatures, with the exception of the vaporizer coil and the equipment used for the eventual condensation of the terephthalic acid, are well insulated with appropriate high temperature insulating materials.

In the pipe 6, it is believed that the hot gaseous carrier stream vaporizes a small portion of the acid charge and carries the remainder along as a dispersed or dilute phase suspension of solid particles in the vapor as the charge mixture travels toward the vaporizer furnace 8. The vaporizing coil 10 is heated externally by fuel gas or other suitable means sufficiently to vaporize all organic components of the charge, including vaporizable impurities, and the reaction mixture enters the transfer line 12 at a temperature of 725° F. as a uniform dispersion or suspension containing the catalyst particles and particles of ash of about 1 to 5 microns particle size as the only unvaporized solid materials present.

Next, the suspension is carried in the line 14 to the top of catalyst collection vessel 16. The coil 10 and pipes 6, etc. through which the charge and reaction mixtures travel are of sizes selected to provide an adequate gas velocity for maintaining the particulate matter uniformly dispersed or suspended in the gas stream with no tendency to deposit on the bottom of the lines. While the minimum suitable gas velocity will vary with the size of the terephthalic acid and the catalyst particles, velocities in the range of about 35 to 100 feet or more per second are appropriate for many purposes.

The collector vessel 16 is provided with an 18-inch deep bed 18 of washed pea gravel ranging in size from ⅛ to ¼ inch supported on a bed 20 of 8–22 mesh, sharp edge, blasting type washed sand of 18-inch depth. These beds have a horizontal cross-sectional area of 62 square feet and the sand rests on a composite support 24 in the form of a woven 30-mesh stainless steel screen laid on a stainless steel expanded metal screen fastened to the wall of the vessel. Convenient manholes (not shown) in the vessel wall are provided for periodic recovery of the catalyst from the beds and the occasional removal of sand and gravel for washing and reuse.

The vapor space above the beds is usually of substantial volume to provide ample residence time for the treatment as may be illustrated by residence times of the order of 1 or 2 seconds from the time the catalyst and hydrogen are commingled with the completely vaporized acid charge until the major part of the catalyst is separated in bed 20.

The vaporizer coil 10 and the collector vessel 16 are preferably operated at a pressure slightly elevated above atmospheric pressure to provide adequate flow through the system.

As the reaction mixture passes downward through the gravel bed 18, some of the ash and catalyst particles are deposited on the upper surface of the bed and also within the bed; then there is a much heavier deposition of suspended particles in the sand bed 20, especially on the surface thereof, with the result that major proportions of both types of suspended particles are trapped and retained in the retention beds. There are indications that the hydrogenation catalyst still has probably a major proportion, e.g., perhaps above about 75%, of its catalytic activity left when it reaches the sand bed and retention of the catalyst particles in the beds permits them to continue to exercise their catalytic function until their activity is spent.

After passing through the sand bed 20, the vapor stream which usually contains small amounts of the ash and catalyst in suspension is transferred from the bottom of collector 16 via line 26 to the dust filter vessel 28 wherein it passes upward through a thin, permeable filter member 30. Ideally, the bed effluent would be free of all suspended solid particles but this is seldom, if ever, possible in large scale operations, and when the effluent contains some ash, a small content of suspended catalyst is desirable in order that the catalyst particles may be deposited on the surface of the dust filter membrane along with the ash particles, for the bulkier catalyst particles serve as a filter aid or assistant in forming a less compact and less cohesive deposit that is more easily dislodged from the filter surface than in the case of cementitious ash particles alone. The dust filter serves to remove substantially all solid particles still remaining suspended in the gaseous reaction product stream, and it is accordingly provided with extremely fine pores or interstices. The filter member 30 is preferably constructed of a heat resistant, woven stainless steel (Type 316L) cloth of 80 x 700 mesh size firmly attached to a supporting grid or coarse stainless steel screen which in turn is fastened to the wall of vessel 28. Such cloth has a nominal pore size of about 40 microns. The effective filter area is a relatively large 1670 square feet in order to obtain an acceptably low pressure drop therethrough.

The collector vessel 16, dust filter 28 and associated transfer lines are maintained at temperatures well above the dew point of the reaction mixture in order to prevent the premature condensation of terephthalic acid which would then be exposed to an excessively long treatment that would tend to decompose the acid.

The filtered gaseous product stream is transferred from the top of filter vessel 28 via pipe 32 to the schematically illustrated condensation equipment 34 wherein the terephthalic acid vapor is cooled and condensed into solid particles. This sublimate is separated from the vapor by any suitable means and then withdrawn at 36 as the purified product of the process with a content of about 15 p.p.m. of p-carboxybenzaldehyde and a greatly reduced content of other organic impurities. This corresponds to an elimination of 99.75 percent of the p-carboxybenzaldehyde present in the crude terephthalic acid charge. The uncondensed vapor stream containing chiefly steam together with lesser amounts of unreacted hydrogen, p-toluic acid, benzoic acid and other impurities of a more volatile nature than terephthalic acid is taken off in line 38.

In the continuous operation of the illustrated purification process, a gradual increase in the pressure drop through the system is observed as a result of the increasing resistance to the flow of the gas stream induced by the gradually increasing solid deposits on the dust filter screen 30 particularly and the sand bed 20. To alleviate this condition, blowback equipment is provided for periodically clearing the deposits from the dust filter and less frequently from the retention beds by temporarily directing a relatively high velocity flow of hot, inert, gaseous material through the filter 30 or through the beds 18 and 20 in the reverse direction to normal flow, preferably as a sudden blast of the blowback agent. The increase in pressure drop through the gravel bed 18 is generally insignificant; hence, unlike the sand bed, the gravel bed seldom, if ever, actually needs a blowback cleaning but is usually subjected to this operation along with the sand bed when both beds are located in the same vessel.

Referring again to the drawing, a blowback tank or accumulator 40 of adequate volume, as exemplified by a capacity of about 500 cubic feet in the instant case, is first pressured with superheated steam from supply line 42 at 700° F. and 100 pounds per square inch gage pressure. Next, in clearing deposits from the dust filter 30, the flow of the reaction mixture is halted by closing the valves in lines 26 and 32, and then the valve in line 44 is opened. Thereafter, a sudden blast of a large volume of the high pressure superheated steam from tank 40 is introduced into the ash filter vessel 28 via manifold 45 by opening the quick-opening valve 46 in blowback branch line 48; and in passing through the filter 30 in a direction opposite to normal flow, the steam dislodges the accumulated solid particles which are carried down the conduit 44 into the dust receiver 50. This receiver is provided with vent means (not shown) for allowing the blowback steam to escape. The superheated steam supply line 42 is usually allowed to remain open for a short interval after the initial surge of expanding steam from tank 40 in order to complete the clearing action. Finally, the blowback steam line 48 and discharge line 44 are shut off and the valves in the transfer lines 26 and 32 reopened to resume normal operations.

When it is desired to clear the sand and gravel beds 20 and 18, the procedure is similar except that the flow of reaction mixture is stopped by closing the valves in transfer lines 12 and 26, and the valve in blowback vent line 52 is opened. Then, the surge of blowback steam released from manifold 45 by quick opening valve 54 passes downward through blowback branch line 56 and then to the collector 16 via pipe 26 and upward through the beds 20 and 18 before it is vented to the atmosphere through lines 14 and 52. This action breaks up any surface encrustation on top of either bed and rearranges the deposits therein sufficiently to substantially restore the original porosity of the sand bed and thus reduce the pressure drop therethrough almost to the original level.

In many cases, it is desirable after long operating periods to thoroughly clean or replace the sand and gravel beds. Adequate cleaning of the bed material can generally be accomplished by removal of the aggregate from the collector vessel and washing in a rotating concrete mixer using a continuous flow of water to carry off the catalyst and ash particles. The washed sand and gravel may be subsequently separated by classifying screens. When utilizing palladium or other costly catalysts, provision is usually made for reprocessing the spent catalyst after recovering it from the wash liquors from the sand and gravel as well as the catalyst and ash particles collected in dust receiver 50.

In start-up operations with beds of fresh or washed sand and gravel, it is often desirable to precoat the beds with the catalyst particles, i.e., to effect an initial deposition of the hydrogenation catalyst in the beds, so that the first portion of crude acid charge will be exposed to approximately the same degree of catalysis as the acid charged later which contacts not only the suspended catalyst but also catalyst previously deposited in the beds by the reaction mixture. Precoating may be easily accomplished by feeding the regular hydrogenation catalyst at double the normal rate into the gaseous carrier for about 30 to 45 minutes without charging any crude acid or hydrogen, and then reducing the catalyst feed to the customary rate and starting to charge the crude acid and hydrogen in the usual manner and the crude acid at a temporarily reduced rate; thus, the resulting reaction mixture is passing through beds that always contain catalyst deposits.

It will be apparent that the specific process described in connection with the flow sheet is capable of many modifications and variations. For example, the hydrogenation catalyst may be heated above the dew point of the reaction mixture and introduced in dry powdered form into transfer line 12 downstream of the vaporizer furnace by means of a screw feeder or other suitable feeding and metering device. Also, it is contemplated that the gravel bed 18 may be omitted without loss of all of the benefits of this invention, or the gravel may be replaced by one or more beds of relatively coarse sand (i.e., coarser than the sand in the final sand bed 20) and the total depth of the such coarse sand beds may be considerably shallower than that of gravel bed 18. Furthermore, the flow of reaction mixture through the catalyst collection bed or beds may be upward rather than downward as long as any coarse particle bed is located upstream of beds of finer particles. Optionally a plurality of catalyst collector vessels 16 and dust filter vessels 28 may be utilized with parallel piping arrangements in order to permit uninterrupted operations while one of such vessels is being subjected to a periodic blowback operation or is shut down for thorough cleaning or other maintenance. In addition, the condensation unit 34 may include any known condensing apparatus and techniques which are suitable for the present purpose including indirect cooling; direct cooling with water sprays, steam or other inert gases; fractional condensation of only a limited portion of the terephthalic acid vapor to promote greater purity, or complete condensation in leaching solvents, etc.

The instant process employing "in depth" filtration of the suspended catalyst and ash particles results in their being deposited in a relatively dispersed manner throughout a substantial depth or volume of the retention beds and this provides a number of important advantages over separating the suspended solids from the vapor by other techniques. First, there is a substantial improvement in catalyst efficiency so that considerably less catalyst, typically only about 25 to 50% of the usual amount, is required in the process. This effect is attributed to utilizing substantially the entire activity of the catalyst by collecting the partially spent catalyst in a retention bed of substantial depth for continuing good contact with the reaction mixture instead of collecting all of the catalyst on dust filters that must be frequently subjected to blowback to dislodge the heavy deposits of ash and catalyst with consequent loss of the substantial residual catalyst activity. Also, the inhibiting or masking effect on catalysis which occurs when ash particles are deposited with or on the catalyst particles in a concentrated manner (e.g., in a thin, dense layer on a flat filter surface) is minimized by the less concentrated collection of particles in a considerable volume of a bed. In a bed of sand of suitable particle size, the catalyst particles tend to deposit therein to a substantial depth of several inches or more and consequently there is much less tendency for the finer ash particles to become lodged in the voids between the catalyst particles and less tendency toward decreasing the porosity of the bed than in the case of simultaneous and compact deposition of such materials on a flat filter surface. Second, there are far fewer interruptions of the normal operating cycle and the on-stream time is extended considerably because less frequent blowback operations are required as a result of the greatly reduced filtering load on the dust filter occasioned by the use of a smaller proportion of catalyst and the collection of most of it along with most of the ash in the retention beds. Third, the overall life of the cloth or other filtering elements in the dust filters is greatly extended (e.g., about 400%), probably as a result of the reduced filtering load on these screens, and there is a corresponding reduction in both maintenance costs and shutdowns for the purpose of manually cleaning or replacing the screens.

The crude acid charge is usually entrained in a hot carrier gas and vaporized therein by the sensible heat of the gas and/or by the use of supplementary heating means. For example, particles of solid crude terephthalic acid can be advantageously charged in a nontacky condition (i.e., at ambient temperature or preheated to a moderately elevated temperature below the temperature level in which the particles become tacky and agglomerate) into a rapidly moving stream of carrier gas to form a transportable suspension of solid particles in the gas stream. The carrier gas is generally preheated, desirably to between about 400° and about 1000° F., and preferably to between about 600° and about 810° F., after which the resulting gaseous stream containing entrained solid acid can be further heated, e.g., by passing the stream through a vaporization coil, to complete the vaporization of the solid acid particles in the stream.

The gaseous carrier may be any gas, vapor or gaseous mixture which is substantially inert to the acid under the conditions of the process, which are more fully defined hereinafter. Nitrogen is a suitable carrier and the hydrogen used in process may be charged in sufficient excess to also serve as part or all of the carrier gas; but steam and gaseous mixtures containing steam, for example in an amount of 30 mol percent or more of the mixture, are preferred as moisture inhibits the undesirable dehydration of such acids as terephthalic acid to their anhydrides and provides a highly desriable steam distillation effect. The carrier gas can be employed in any amount which is capable of transporting the crude terephthalic acid and/or in providing sensible heat for at least partial vaporization of the terephthalic acid. For instance, up to 50 mols or more of entrainer gas per mol of crude acid may be used, and from 8 to 30 mols of steam per mol of crude terephthalic acid are generally recommended as adequate to provide for suitable dispersion of the acid and catalyst in the carrier gas during the final stages of vaporization of the solid particles. Initially, the entrained suspension may have a higher concentration of solids with more gaseous carrier being added before entering the vaporizer coil, but there do not appear to be any significant advantages in this procedure.

The catalyst which is used in the process of this invention is a finely divided solid catalyst having hydrogenation activity. Examples of the hydrogenation components of the catalysts which are useful in the present process include, inter alia, cobalt molybdate, nickel sulfide, nickel tungsten sulfide, tungsten disulfide, magnesium-activated copper, molybdenum sulfide, copper chromite, reduced nickel oxide, ruthenium oxide and especially the chemically uncombined metals of Group VIII of the Periodic Table of the Elements. Preferably, the hydrogenation component includes a Group VIII metal such as ruthenium rhodium, palladium, osmium, iridium and platinum; and platinum and palladium are particularly recommended. In most cases, the hydrogenation component of the catalyst is advantageously disposed on a solid suport. Carbonaceous materials (e.g., charcoal, powdered carbon, etc.) are preferred as supports for the hydrogenation component, but various other supports, such as colloidal silica are also suitable. Accordingly, the catalyst composition may comprise a supported active hydrogenation component in an amount of from about 0.05% to about 10% or more, based on the total weight of the catalyst. Especially good results are obtainable with a catalyst containing from about 0.1% to about 8% by weight of palladium on a powdered carbon support.

In the instant process, the catalyst particles are dispersed in the vapor mixture for concurrent flow in the gas stream containing the vaporized crude acid. The catalyst particles may be of any size suitable for entrainment in the stream, and usually the average particle size is less than about 600 microns, as may be illustrated by a catalyst containing a major proportion by weight of particles in the size range of about 20 to 100 microns.

The finely divided catalyst can be added to the reaction mixture by any convenient method, such as by mixing the catalyst particles with the crude acid before introduction into the gaseous carrier stream, or by injecting the catalyst separately as a heated, dry powder or by vaporizing a slurry containing the catalyst particles dispersed in a suitable liquid, such as water, in sufficient dilution that the slurry can be conveniently pumped, e.g., ten or more parts of liquid per part of catalyst.

The catalyst can be added to the gaseous stream in any amount sufficient to effect the desired degree of purification of the crude acid charge. Substantial purification can usually be achieved with a feed ratio of up to 10,000 pounds of crude acid (or even more when the content of impurities is low) per pound of hydrogenation catalyst (total weight of catalyst including any support); however the process is generally carried out with a feed ratio of between about 600 and 7,200 pounds of crude terephthalic acid per pound of composite catalyst in the case of the preferred Group VIII metals on supports, which may be expressed otherwise as about 12,000 to 144,000 pounds of crude acid per pound of palladium.

The crude terephthalic acid is contacted with the hydrogenation catalyst in the presence of hydrogen which can comprise a substantial proportion of the vaporous mixture. In a particularly useful embodiment of the process, the vaporized acid is contacted by the catalyst in the presence of at least about 1 s.c.f., and preferably between about 1 and 30 s.c.f. of hydrogen per pound of crude acid feed. The vaporous mixture which is contacted with the hydrogenation catalyst may be substantially or wholly comprised of vaporized crude acid and hydrogen with the latter serving also as a carrier gas, but it is generally advantageous, as pointed out hereinbefore, to have an inert gas or vapor, such as steam, also present in the gaseous mixture.

The temperature at which the vapor mixture containing the crude terephthalic acid is contacted with a hydrogenation catalyst need not be higher than the lowest temperature required to vaporize and suitably disperse the terephthalic acid. In general, the contact between the vapor mixture and hydrogenation catalyst in the presence of hydrogen is carried out below about 1,000° F., and for a suitable length of time which may be varied as desired over a wide range, for example for as long as a few minutes but usually for a fraction of a minute, e.g., between about 1 and 40 seconds. Good results are generally obtained with from 1 to 10 seconds total contact time prior to the reaction mixture leaving the final catalyst retention bed.

The bed of inert refractory material should be able to withstand the relatively high treating temperatures that are often employed without either melting or vaporizing and also without any excessive fracturing or crumbling in service which might produce an excessive dust load on the ash filter. In addition to being inert or nonreactive with the acid undergoing purification, the bed material should not promote any undesirable side reactions and not inhibit the hydrogenation catalyst. Sand and gravel are preferred for the purpose by reason of their low cost and ready availability, but a wide variety of other materials may be utilized, as exemplified by alumina, beads of heat-resistant glass, expanded vermiculite and certain metals, such as titanium balls or granules.

Although complete separation of catalyst and ash particles is usually not obtainable in this simple process, the degree of retention of these materials in the collection bed of fine material can be controlled to a considerable extent. For example, within reasonable ranges, the retention of suspended solids is increased by decreasing the average particle size of the bed material and generally to a lesser extent by increasing the depth of the bed. Often, the difference between the average particle sizes of the suspended catalyst and ash particles is significant, and a greater size differential usually improves the degree of segregation obtainable. Also, the matter of permissible pressure drop in the equipment cannot be ignored in practical operations. In view of the complex interrelationship of these factors, experimentation is frequently the best method of determining the optimum particle size of the bed material and optimum catalyst size as well as the number, area and depth of the beds for each individual purification process based on the concept of retaining as much of the catalyst and ash as possible within the beds, that is either inside the bed or on its surface, without creating excessive resistance to the flow of the vapor.

The fine collection bed may generally range in depth from about 0.7 inch to 3 feet or more and a bed depth of the order of about 5 to 24 inches is often used in the case of terephthalic acid. A suitable average particle size on a weight basis of this bed material may be expressed as the 8 to 80 mesh per lineal inch size range (U.S. Sieve Series). For the terephthalic acid treatment, a mesh range of about 8 to 60 is usually desirable, and good results have been obtained with a sand which passed through an 8-mesh screen and was completely retained on a 16-mesh screen as well as an 8–22 mesh sand. Although there is apparently nothing to be gained thereby, the bed may also contain a sizable number of coarse particles, such as the gravel described herein. In comparison with the collection of the catalyst particles as a thin layer on the surface of this type of bed, there are indications that superior results are obtainable when the deposition occurs within the bed also to a depth of at least 0.5 inch and preferably through at least a quarter of the depth of the bed. The catalyst deposition often appears to be chiefly concentrated in the first or upper third of the sand bed whereas there is reason to believe that the small amount of ash lodging in the bed tends to penetrate deeper by reason of its smaller size and become more evenly distributed throughout the bed with the desirable result of minimizing the amount of ash deposited in actual contact with catalyst particles.

The use of one or more beds of gravel or other coarse aggregate is optional but often desirable in the practice of the present invention. The coarse bed may be separately supported and located at a distance upstream from the bed of sand or other fine inert solid material. However, in at least some instances as exemplified by the treatment of terephthalic acid, it is preferred to place the coarse bed directly on top of the sand bed as it has been observed that such arrangement substantially reduces the tendency toward formation of a crust of solid deposits on the upper surface of the sand bed. The catalyst deposits are fairly uniform throughout the depth of the coarse bed in many cases. Accordingly, such extended deposits provide for good contact of the reaction mixture with a catalyst that retains substantial residual activity.

In general, the coarse particle bed may contain a major weight proportion of refractory material within the 1/8 to 1/2 inch size range; however a particle size range of 1/8 to 1/4 inch is often preferable as in the case of terephthalic acid purification. While the bed may also contain a sizable number of considerably larger granules, etc., these produce no added benefits. Since the pressure drop is considerably less in gases flowing through a coarse bed, such beds may be considerably deeper (e.g., 50% or more) than the sand beds. For illustration, a gravel bed may be from about 0.5 to 5 or more feet in depth.

It is often desirable to have the refractory particles in the retention beds as uniform in size as may be reasonably possible in order to obtain the minimum resistance to gas flow provided by maximum porosity and maximum volume of voids for the selected size of particles along with a minimum tendency toward compaction or settling of the bed.

Also, the cross-sectional area of the surface of the coarse bed may range between about 5 to 6,000 square feet (preferably about 5 to 100 square feet for economy) per ton of crude acid charged per hour, and a corresponding area is suitable for a relatively fine particle bed.

After passing through the catalyst retention beds, the gaseous reaction mixture generally still contains solid particles in suspension which comprise a minor portion of the catalyst charged and of the original ash. This suspended matter is eliminated by passing the gaseous mixture through a suitable filtering device equipped with an extremely fine filter medium, as exemplified by the fine woven metal screens described earlier, ceramic mesh, porous metal plates prepared by sintering stainless steel or titanium powder, etc.

After filtration, the vapor mixture is either directly or indirectly cooled in the substantial absence of any solid foreign matter, to any temperature which is low enough to condense at least a substantial proportion of the acid vapor back into the solid state. In the case of terephthalic acid, it is usually desirable to cool the hot vapor to a temperature between about 420 and 550° F. when condensation is carried out at atmospheric pressure. Thereafter, the desired acid sublimate may be separated as the purified product of the process in particulate form from the cooled mixture by any appropriate means, such as a cyclone separator, filter or bag collector. Extremely high reductions in the p-carboxybenzaldehyde content of the acid are obtainable in this process; for example, the product frequently contains less than 0.5% of the p-carboxybenzaldehyde originally present in the crude terephthalic acid. The unreacted hydrogen, hydrogenation products, any impurities more volatile than the acid and any carrier gas are withdrawn in the gaseous state from the condensation zone. It is contemplated that it may be feasible in certain instances to recover certain components of this exit gas for further purification as, for instance, where it has a substantial content of uncondensed acid.

Although the instant process has been described herein chiefly in relation to a specific embodiment for the purpose of providing a fully detailed disclosure, this combination of sublimation with a treatment involving suspended catalyst particles and collection of the suspended catalyst in beds of substantial depth is obviously applicable to the purification of a wide variety of aromatic polycarboxylic acids with different hydrogenation catalysts and various retention bed materials under widely different processing conditions. Accordingly, the present invention should not be construed as limited in any particulars except as may be recited in the appended claims or required by the prior art.

What is claimed is:

1. In a process for purifying an impure, vaporizable, aromatic polycarboxylic acid contaminated with an aromatic aldehyde by contact of the crude acid vapor at elevated temperatures with particles of a solid hydrogenation catalyst, the improvement which comprises forming a suspension of finely divided entrainable particles of said catalyst in a gaseous mixture containing said acid vapor and hydrogen, passing said suspension through at least one bed of substantial depth containing discrete particles of refractory solid material within the 8 to 80 mesh size range and suitable for the retention therein of a major proportion by weight of said catalyst and thereafter condensing said acid vapor to solid form in the substantial absence of said catalyst.

2. A process according to claim 1 in which said catalyst comprises a metal of Group VIII of the Periodic Table of Elements.

3. A process according to claim 1 in which said catalyst comprises palladium metal on a carbon support.

4. A process according to claim 1 in which said catalyst comprises platinum metal on a carbon support.

5. A process according to claim 1 in which at least a major proportion by weight of said catalyst comprises particles smaller than about 100 microns in size and said bed contains refractory particles predominantly within the 8 to 80 mesh size range.

6. A process according to claim 1 in which said acid is terephthalic acid.

7. In a process for the purification of a crude terephthalic acid contaminated with p-carboxybenzaldehyde by contact of the crude acid vapor at elevated temperatures with particles of a solid hydrogenation catalyst, the improvement which comprises forming a suspension of finely divided particles of said catalyst averaging less than 600 microns in size in a mixture containing hydrogen, terephthalic acid vapor, paracarboxybenzaldehyde vapor and suspended ash particles having a substantially smaller average particle size than said catalyst, passing said suspension through at least one bed of substantial depth containing discrete particles of refractory solid material of sizes suitable for retaining at least a major proportion of said catalyst and a substantial proportion by weight of said ash, separating substantially all of the remaining suspended solid particles from the effluent from said bed and thereafter cooling the resulting gaseous material in the substantial absence of said catalyst and ash particles to condense the vaporized terephthalic acid as a sublimate having a substantially lower p-carboxybenzaldehyde content than said crude terephthalic acid.

8. A process according to claim 7 in which said catalyst comprises palladium metal on a carbon support.

9. A process according to claim 7 in which said catalyst comprises platinum metal on a carbon support.

10. A process according to claim 7 in which at least a major proportion by weight of said catalyst comprises particles smaller than about 100 microns in size and said bed contains refractory particles predominantly within the 8 to 60 mesh size range.

11. A process according to claim 7 in which said bed contains sand.

12. A process according to claim 7 in which the effluent from said bed is passed through a relatively thin porous filter member to separate the residual suspended solid particles from the gaseous material in said effluent.

13. A process according to claim 7 in which the flow of said suspension through said bed is periodically interrupted and a high velocity flow of heated gaseous material is passed through said bed in the reverse direction to decrease the resistance to gas flow through said bed.

14. A process according to claim 7 in which the charge to said process comprises between about 12,000 and 144,000 pounds of crude terephthalic acid per pound of palladium as a catalyst component and between about 1 and 30 standard cubic feet of hydrogen per pound of crude terephthalic acid and said terephthalic acid sublimate has a para-carboxybenzaldehyde content amounting to less than about 0.5% of the para-carboxybenzaldehyde content of said crude terephthalic acid.

15. In a process for the purification of a crude terephthalic acid contaminated with p-carboxybenzaldehyde by contact of the crude acid vapor at elevated temperatures with particles of a solid hydrogenation catalyst, the improvement which comprises forming a suspension of finely divided particles of said catalyst averaging less than 600 microns in size in a mixture containing hydrogen, terephthalic acid vapor, para-carboxybenzaldehyde vapor and suspended ash particles of substantially smaller average particle size than said catalyst, passing said suspension through a bed of substantial depth containing discrete coarse particles of refractory solid material, thereafter passing said suspension through a bed of substantial depth containing discrete fine particles of refractory solid material having an average particle size substantially smaller than that of said coarse particles and suitable for retaining at least a major proportion of said catalyst and a substantial porportion by weight of said ash in said fine particle bed, separating substantially all of the remaining suspended solid particles from the effluent from said fine particle bed and subsequently cooling the resulting gaseous material in the substantial absence of said catalyst and ash particles to condense the vaporized terephthalic acid as a sublimate having a substantially lower p-carboxybenzaldehyde content than said crude terephthalic acid.

16. A process according to claim 15 in which said catalyst comprises a metal of Group VIII of the Periodic Table of Elements.

17. A process according to claim 15 in which said catalyst comprises palladium metal on a carbon support.

18. A process according to claim 15 in which said catalyst comprises platinum metal on a carbon support.

19. A process according to claim 15 in which the charge to said process comprises between about 600 and 7,200 pounds of crude terephthalic acid per pound of catalyst and between about 1 and 30 standard cubic feet of hydrogen per pound of crude terephthalic acid, and said condensed terephthalic acid product has a p-carboxybenzaldehyde content of less than about 0.5% of the p-carboxybenzaldehyde content of said crude terephthalic acid.

20. A process according to claim 15 in which said coarse particle bed contains gravel and said fine particle bed contains sand.

21. A process according to claim 15 in which at least a major proportion by weight of said catalyst comprises particles smaller than about 100 microns in size, said coarse particle bed contains major proportion by weight of refractory particles within the ⅛ to ½" size range and said fine particle bed contains refractory particles predominantly within the 8 to 22 mesh size range.

22. A process according to claim 21 in which said coarse particle bed contains gravel and said fine particle bed contains sand.

References Cited
UNITED STATES PATENTS

| | | | |
|---|---|---|---|
| 3,058,997 | 10/1962 | Taylor et al. | 260—525 |
| 3,236,885 | 2/1966 | Gray | 260—525 |
| 3,288,849 | 11/1966 | Meyer | 260—525 |

FOREIGN PATENTS

| | | | |
|---|---|---|---|
| 597,876 | 5/1960 | Canada | 260—525 |
| 726,213 | 1/1966 | Canada | 260—525 |

OTHER REFERENCES

Weissberger, Technique of Organic Chemistry, vol. III, Part I. Separation and Purification, 1956, p. 710.

LEWIS GOTTS, Primary Examiner

R. WEISSBERG, Assistant Examiner